(12) United States Patent
Wnuk et al.

(10) Patent No.: US 9,855,520 B2
(45) Date of Patent: *Jan. 2, 2018

(54) FILTERING APPARATUS

(75) Inventors: Ralf Wnuk, Bexbach/Kleinottweiler (DE); Jörg Hermann Gerstner, Püttingen (DE); Thomas Bottcher, Illingen-Hüttigweiler (DE); Thomas Morawietz, Homburg-Erbach (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 701 days.

This patent is subject to a terminal disclaimer.

(21) Appl. No.: 13/261,764

(22) PCT Filed: Apr. 26, 2012

(86) PCT No.: PCT/EP2012/001772
§ 371 (c)(1),
(2), (4) Date: Apr. 1, 2014

(87) PCT Pub. No.: WO2012/150010
PCT Pub. Date: Nov. 8, 2012

(65) Prior Publication Data
US 2014/0202938 A1      Jul. 24, 2014

(30) Foreign Application Priority Data
May 5, 2011    (DE) .................. 10 2011 100 518

(51) Int. Cl.
*B01D 29/66*    (2006.01)
*B01D 29/52*    (2006.01)

(52) U.S. Cl.
CPC .......... *B01D 29/665* (2013.01); *B01D 29/52* (2013.01); *B01D 29/668* (2013.01)

(58) Field of Classification Search
CPC .... B01D 29/52; B01D 29/665; B01D 29/668; B01D 35/12
See application file for complete search history.

(56) References Cited

U.S. PATENT DOCUMENTS 3,283,903 A     11/1966   Muller
3,380,591 A  *   4/1968   Muller ................. B01D 29/114
                                                      210/143

FOREIGN PATENT DOCUMENTS

DE    1 241 803         7/1963
DE    1 801 441 A1     6/1970
(Continued)

OTHER PUBLICATIONS

English Machine Translation of DE4030084, Mar. 1992.*
English Translation of DE1801441, Jun. 1970.*

*Primary Examiner* — Terry K Cecil
(74) *Attorney, Agent, or Firm* — Wenderoth, Lind & Ponack, L.L.P.

(57) ABSTRACT

A filtering apparatus has a plurality of filtering elements (9) in a filter housing (1), a filter inlet (45) and a filter outlet (43). During the filtration operation, one of the filtering elements (9) can be back-flushed by a back-flushing device (13, 21). The back-flushing device has a pressure control device (13) including a hydraulic accumulator (13). One accumulator fluid chamber (67) can be filled during the filtration operation with a quantity of filtered fluid and can be connected for a back-flushing operation via a back-flushing guide (21) to the clean side (59) of the filtering clement (9) to be cleaned. Another accumulator fluid chamber (79) can be subjected to a media pressure.

16 Claims, 5 Drawing Sheets

(56) References Cited

FOREIGN PATENT DOCUMENTS

| DE | 40 30 084 A1 | 3/1992 |
| DE | 103 25 525 A1 | 1/2005 |
| DE | 10 2007 054 737 A1 | 5/2009 |
| WO | WO 01/34274 A1 | 5/2001 |

* cited by examiner

FILTERING APPARATUS

FIELD OF THE INVENTION

The invention relates to a filtering apparatus with a plurality of filtering elements that can be accommodated in a filter housing having a filter inlet for fluid that is to be filtered and a filter outlet for the filtered fluid. During the filtration operation, at least one of the filtering elements can be back-flushed by a back-flushing device. The back-flushing device contains a pressure-control device for supporting the back-flushing operation to clean the effective filtering surface of said filtering element.

BACKGROUND OF THE INVENTION

A filtering apparatus of this class is disclosed in DE 10 2007 054 737 A 1. Such a filtering apparatus allows for continuous filtration operation. Successive filtering elements that must be regenerated are back-flushed, while the filtration operation is continued by the remainder of the filtering elements, such that the filtration operation is never interrupted.

In the known filtering apparatus, the back-flushing operation does not only occur in such a manner that, during the back-flushing phase, the system pressure, which is present inside the filtering apparatus, causes a partial flow of the filtrate to flow in the reverse direction through the filtering element that is to be cleaned to loosen and remove dirt from the element. Instead, with the goal of being able to remove more persistent impurities as well, a pressure-control is used on the respective filtering element that is to be back-flushed in order to create a vacuum. Therefore, the back-flushing operation is not only subject to the effective system pressure, but also to the effect of the pressure control, whereby a higher pressure gradient is available for loosening impurities.

On the filtering apparatus that is known in the art, the pressure-control device includes a blocking element that is able to block the fluid connection between the fluid that flows into the filter housing and that is to be filtered and the respective filtering element that is to be back-flushed during a back-flushing operation. Prior to the back-flushing process, this blocking element results in an interruption of the fluid flow that enters the filtering element, such that the flow rate, which is in effect at the time of the locking process, generates, by way of a flow-dynamic effect, a suction effect. Consequently, the back flow of the filtrate on the clean side of the respective filtering element is not only supported by the system pressure, but the back-flow of the filtrate is intensified by the post-suction effect, which is available due to the dynamic effect resulting from blocking out the flow that flows in from the untreated side.

However, the magnitude of the hydrodynamic effect that is achieved by the blocking process depends on the flow rate and is, therefore, correspondingly limited. In application fields where tough contaminations must be expected that are difficult to loosen from the filtering surface, the risk exists that the hydrodynamically supported back-flushing effect is not completely satisfactory.

SUMMARY OF THE INVENTION

An object of the present invention to provide an improved filtering apparatus that is able to achieve a particularly effective back-flushing effect, which effect is supported by pressure control.

According to the invention, this object is basically achieved by a filtering apparatus having, as a crucial special aspect of the invention, a pressure-control containing a hydraulic accumulator with one fluid chamber that can be filled with a quantity of cleaned fluid, while the apparatus operates in the filtration operation, and can be connected, via a back-flushing guide, to the clean side of the respective filtering element that must be cleaned for a back-flushing operation. Applying pressure to a further fluid chamber of the hydraulic accumulator causes the effected movement of the separating element of the hydraulic accumulator to eject the filling volume of the fluid, which fluid reaches the filtering element that is to be cleaned via the back-flushing guide, as a back-flushing fluid.

By selecting the media pressure that is used inside the hydraulic accumulator for moving the separating element, the user is able to optimally adjust the flow rate of the back-flushing fluid that reaches the filtering element via the back-flushing guide to the circumstances that apply. Specifically, the media pressure can be selected such that, by adjusting the same to the type of filter medium, an optimal back-flushing effect can be achieved. In particular, with comparatively pressure-resistant filtering elements, such as tapered or cylindrical slotted-screen tube elements, high pressure levels can be applied, and therefore, high flow rates, from the hydraulic accumulator, thereby loosening even tough impurities from the filter surface.

In advantageous embodiments, the further fluid chamber of the hydraulic accumulator for the back-flushing operation can be connected to a media pressure source for the back-flushing operation by a valve control, particularly in the form of a compressed air source. In many instances, the use of compressed air can be especially advantageous, for example when the filtering apparatus is operated in connection with systems or facilities that are provided with a compressed air supply. Other gaseous media, mixtures of gas and alcohol as well as mixtures of fluids and solids, could be envisioned as pressure media. In addition, particularly in underwater facilities, such as deep-sea drilling applications, sea water can be used as a pressure medium that is subject to deep-sea pressure.

In especially advantageous embodiments, the hydraulic accumulator and the back-flushing guide are connected to each other, rotatably disposed inside the filter housing, and movable, to execute adjustment movements between filtration operation and back-flushing, by a rotary drive. An arrangement of this kind facilitates a particularly simple and compact structural assembly, in that a drive is mounted on one free and easily accessible end of the hydraulic accumulator in the form of an electrical gear motor that transfers the rotary movement via the hydraulic accumulator to the back-flushing guide. The back-flushing guide is disposed further to the inside of the apparatus, adjusting the same in the rotary positions, in which the fluid connection is established, to the filtering element that is to be cleaned.

Particularly advantageously, the hydraulic accumulator is envisioned as a piston accumulator that can be rotated around the cylinder axis together with the back-flushing guide, which is disposed on one cylinder end. In comparison to other types of accumulator constructions, such as diaphragm accumulators, spring accumulators, bellows accumulators and the like, aside from their robust construction, piston accumulators are characterized by the good ratio between the structural size and filling capacity of cleaned fluid than can be accommodated, which corresponds to the total stroke of the piston, and therefore, approximately the total volume of the accumulator cylinder.

Especially advantageously, the filtering elements can be accommodated in their own element chambers, which are disposed inside the filter housing on a circular line forming a concentric circumference around the cylinder axis.

With this type of a concentric arrangement, the hook-up or connector connections of the individual element chambers to the rotatable back-flushing guide can have an especially simple design.

Especially advantageously, the element chambers include a first chamber hook-up or connector connected to the clean side of the filtering element and a second chamber hook-up or connector connected to the untreated side. Both hook-ups or connectors are open toward a main chamber of the filter housing, with the rotatable back-flushing guide extending into the main chamber as a switching organ or valve. The adjusting movements of the switching valve control the inflow and outflow of fluid to and from the first and second chamber hook-up or connector for the back-flushing operation.

To provide a particularly compact structural assembly, the back-flushing guide can function as a separating valve as well, which separates the main chamber of the filter housing into a filtrate part that includes the filter outlet and a non-filtrate part that includes a filter inlet. With larger nominal widths of the filter and long filtering elements, advantageously the piston accumulator can be integrated in the switching valve of the rotatable back-flushing guide between the first chamber hook-up or connector connected to the clean side of the filter element and the second chamber hook-up or connector connected to the untreated side, or even to dispose the same externally and connect it by a channel for the back-flushing medium to the switching valve. To this end, the back-flushing guide includes, with an axial spacing from the piston accumulator and the opposite end thereto, an annular body. The annular body has a circumferential radial seal that forms a radial projection dividing the main chamber, together with the wall of the main chamber, into a filtrate part and a non-filtrate part.

With regard to the switching function that the back-flushing guide performs during the rotational movement thereof, the mouths of the first and second chamber hook-ups or connectors of the element chambers can be disposed on a wall of the filtrate part and/or non-filtrate part that constitute a cylinder area. When changing to the back-flushing operation, hook-up or connector ends that project from the cylinder axis, respectively, from the inflow and outflow lines, which are formed on the back-flushing guide, become congruent with the chamber hook-ups or connectors. The inflow line constitutes the connection of the first fluid chamber of the piston accumulator with the first chamber hook-up or connector. The outflow line constitutes the connection of the second chamber hook-up or connector with the back-flushing outlet of the main chamber.

Preferably, the back-flushing outlet can be blocked and released by a valve apparatus.

With regard to the valve that controls the activity of the hydraulic accumulator, the apparatus can be advantageously provided such that a valve, which can be actuated by a pressure device, is present, preferably in form of a 5/2-way valve. That valve controls the connection of the fluid chamber of the hydraulic accumulator, which can be pressurized by the pressure medium, to the related pressure source.

An especially advantageous embodiment provides for a further valve, preferably in the form of a 3/2-way valve, disposed in the connection of the fluid chamber with the pressure source. That valve allows for optionally reducing the medium pressure.

In especially advantageous embodiments, the fluid chamber of the hydraulic accumulator that receives the quantity of the cleaned fluid can be filled via a flow-control disposed between the filtrate part of the main chamber and the inflow line of the back-flushing guide. This way, the filling process is ensured to take place each time without a drop in the system pressure, due to a major, branched off volume flow that is accompanied by the corresponding reduction of the filtrate volume flow released by the device.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
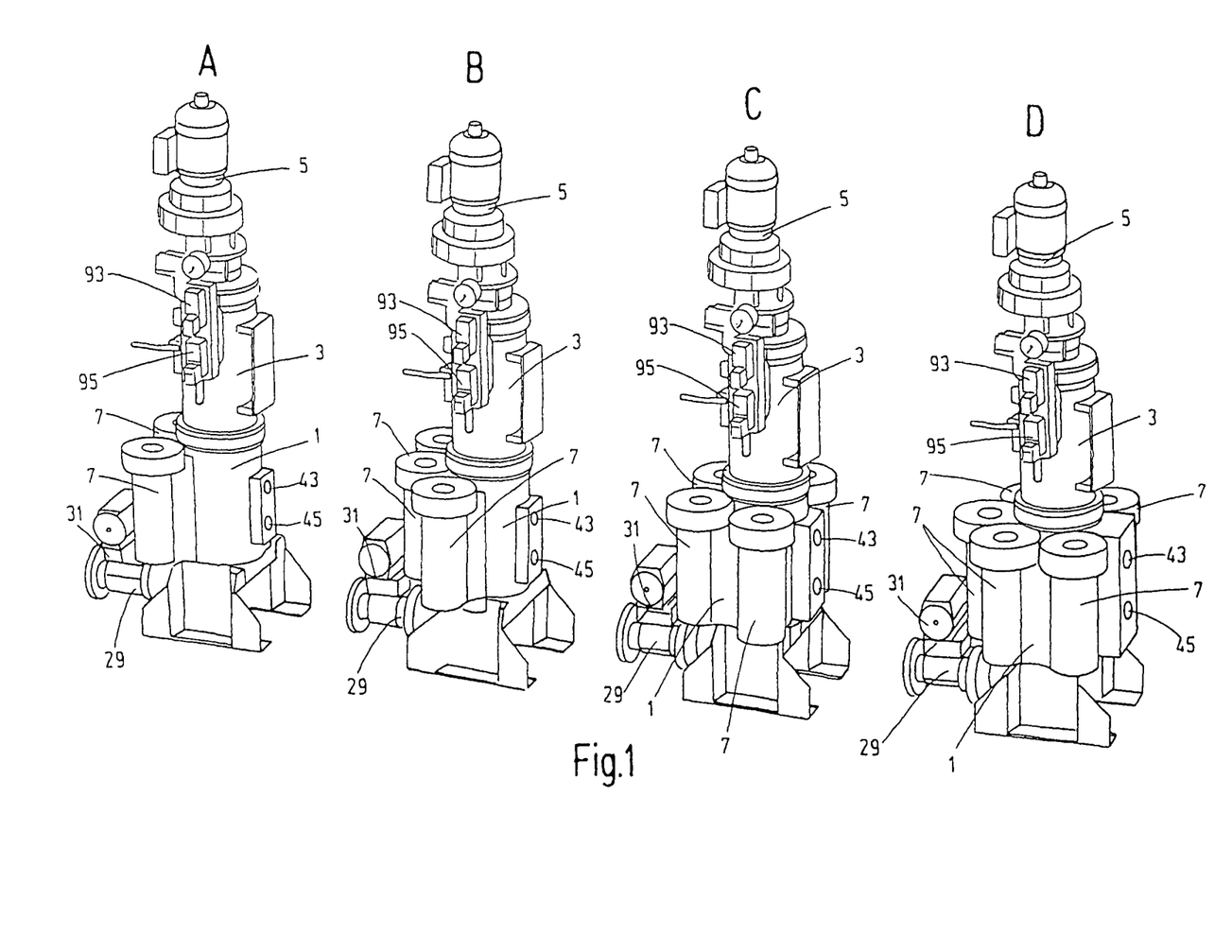
FIGS. 1A to 1D are perspective views of the filtering apparatus according to exemplary embodiments of the invention, with two, three, four or five filtering element chambers, respectively, shown at an angle and drawn in a schematically simplified manner.
Figure 2:
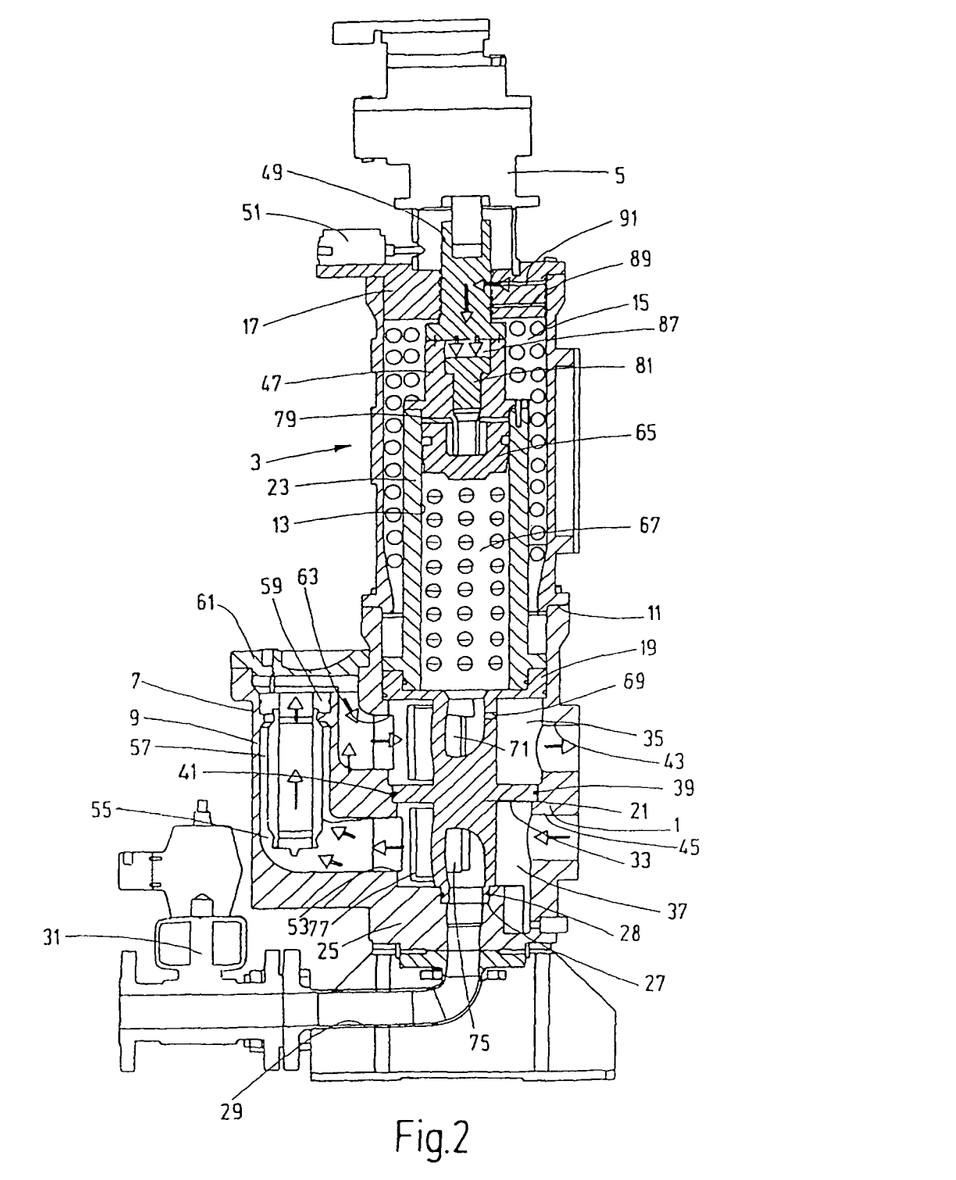
FIG. 2 is a side view in section of the central area of an element chamber, drawn on an enlarged scale in comparison to the FIG. 1, to illustrate the filtration operation.
Figure 3:
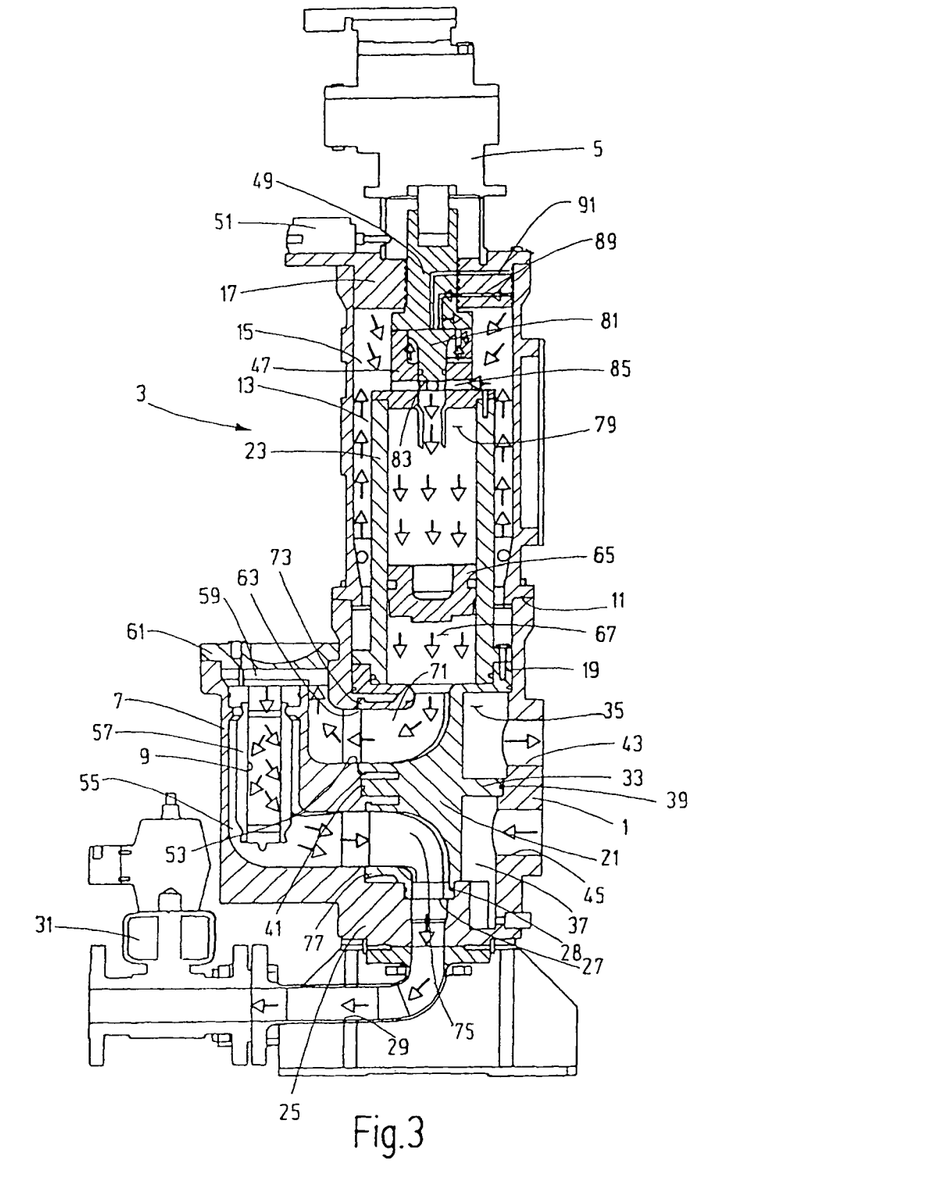
FIG. 3 is a side view in section corresponding to FIG. 2, illustrating the operating state of the back-flushing for the element chamber.

FIG. 1 depicts in the partial FIGS. 1A to 1D the overall view, respectively, of the filtering device according to the invention, including a main part of the housing 1, an accumulator 3 and a drive part 5. FIG. 1 also illustrates that the device according to the invention can be configured in the manner of a modular assembly system for operation with a varying number of filtering elements. FIG. 1A shows an example with two filtering element chambers 7, with each being able to accommodate one filtering element 9 (FIGS. 2 and 3). FIG. 1B, on the other hand, shows an example with three filtering element chambers 7. FIG. 1C is an example with four element chambers 7. FIG. 1D is an example with five element chambers 7. A filtering element can also be formed by a plurality of filter candles in a holder.

As can be derived from FIGS. 2 and 3, the accumulator part 3, taking the form of a hollow cylinder, is connected by a flange connection to the top open end 11 of the main part 1. A piston accumulator 13 is coaxially disposed in the hollow cylinder, such that the cylinder axis of the accumulator defines the vertical axis of the accumulator part 3. An intermediate space between the outside of the piston accumulator 13 and the jacket of the accumulator part 3 constitutes a gas pressure chamber 15, which is closed at the top end by a housing lid 17 and sealed at the bottom end, relative to the main part of the housing 1, by the circumferential rim 19 of a back-flushing guide 21. Flushing guide 21 forms, by the circumferential rim 19 thereof, a sealed apron at the bottom end of the cylinder 23 of the piston accumulator 13.

The back-flushing guide 21 extends away from the bottom open end of the cylinder 23, through a main chamber of the main part of the housing 1, to the base part 25 of housing 1, where a back-flushing outlet 27 is disposed. The back-flushing guide 21 is sealed in relation to the back-flushing outlet 27 by a sealing element 28.

On the back-flushing outlet 27, a back-flushing line 29 follows and can be blocked and opened by a motor valve 31. Approximately half way between the piston accumulator 13 and the end located at the back-flushing outlet 27, the back-flushing guide 21 includes an annular body 33 forming a radial projection separating the main chamber of the main part of the housing 1. Through annular body 33, the back-flushing guide 21 passes into a filtrate part 35 and a non-filtrate part 37. To provide a leak-proof separation, the annular body 33 includes a circumferential seal 39 that acts in conjunction with the interior wall 41 of the main chamber. The filter outlet 43 for the filtered fluid is disposed on the filtrate part 35. The filter inlet 45 for fluid that is to be filtered is disposed on the non-filtrate part 37.

At the top end, as seen in the drawing, the cylinder 23 of the piston accumulator 13 is closed by an end piece 47. The top end of end piece 47 is connected to a coupling piece 49 connected to the output shaft of a gear motor of the drive part 5. This way, the entire unit, comprising the piston accumulator 13 and back-flushing guide 21, as a whole, can be rotated inside the accumulator part 3 and the main part of the housing 1. A limit switch 51 is provided for controlling the rotary settings.

In FIGS. 2 and 3, one of the filtering element chambers 7 is illustrated in section. Each element chamber 7 contains one filtering element 9 in the manner of a filter candle having a cylindrical or tapered shape. For example, a slotted-screen tube element is also possible. FIG. 2 shows the operating state for the filtration operation of this filtering element 9. As illustrated by the flow arrows, the fluid flows in via inlet 45, and enters the non-filtrate part 37 flowing around the back-flushing guide 21. Via a chamber hook-up or connector 53 disposed in the wall 41 of the main chamber of the housing 1, the fluid then flows into the untreated side 55 of the element chamber 7. From there, the fluid flows through the filtering medium 57, from the outside to the inside, to the clean side 59 of the element chamber 7 that is closed by a chamber lid 61. The cleaned fluid then reaches the filtrate side 35 via a chamber hook-up or connector 63, exiting the apparatus via the filter outlet 43 thereof.

FIG. 2 shows that, in this operational state of the filtration, the piston 65 is located at the top end of the cylinder 23, and the fluid chamber 67, that is adjacent to the bottom side of the piston 65, has its greatest volume. The chamber 67, as indicated by the circular symbols with crosswise lines, is filled with a volume of cleaned fluid. During the filtration operation, this filling volume leaves the filtrate part 35 via a flow-control 65 and enters the inflow line 71. Inflow line 71 is configured on the inside of the back-flushing guide 21 and is open at its end directed toward the adjacent fluid chamber 67 of the piston accumulator 13. The other end of this inflow line 71 forms a hook-up or connector end 73, which projects radially from the cylinder axis and which is closed in the filtration operation, as shown in FIG. 3, by resting against the inside wall 41 of the main part of the housing.

At the bottom end of the back-flushing guide 21, the back-flushing guide forms an outflow line 75 that corresponds to the inflow line 71 in terms of the structural form. Outflow line 75 is connected to the back-flushing line 29 at its bottom end, as shown in the drawing, and forms another radially projecting hook-up or connector end 77 at the other end, which is closed, as shown in the rotational position of the back-flushing guide 21 according to FIG. 2, in the same manner as the other hook-up or connector end 73, by resting against the wall 41.

In the operating state of FIG. 2, the fluid chamber 79, which is adjacent to the top end of the piston 65, has the smallest volume. This chamber 79 can be pressurized with compressed air for a back-flushing process, as depicted in FIG. 3. The compressed air can flow from the gas pressure chamber 15 into the chamber 79 via a piston accumulator valve. In the representation depicted in FIG. 2, the valve piston 81 of the piston accumulator valve, that is movable within the end piece 47, is in its closed position.

Figure 4:
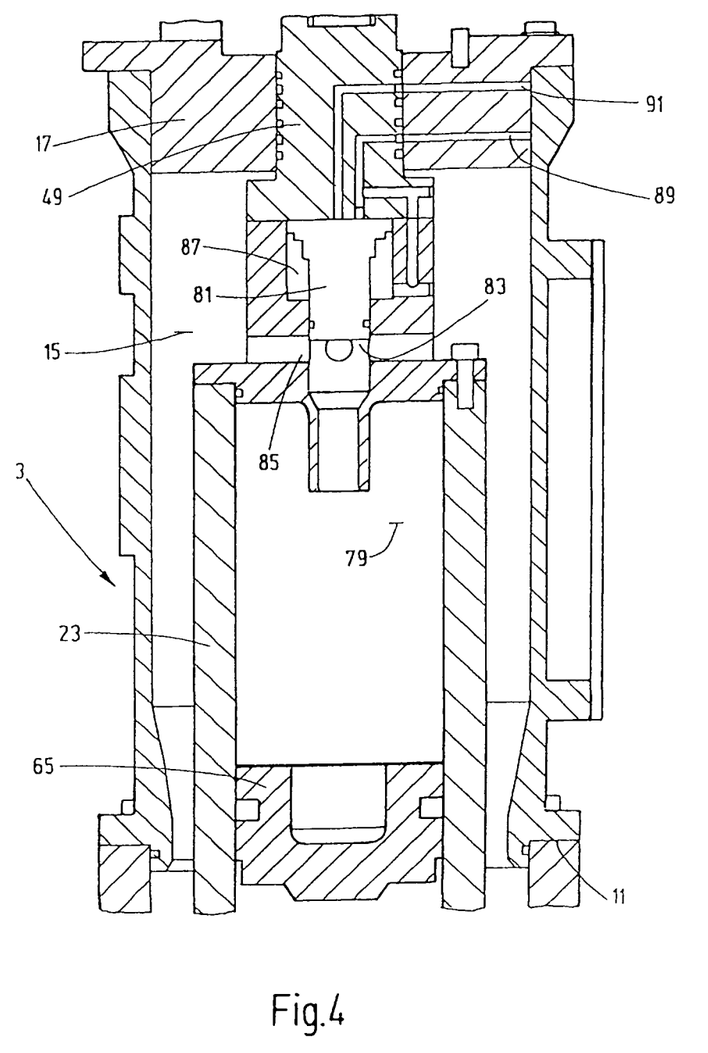
FIG. 4 is a partial side view in section, drawn on an enlarged scale as compared to FIGS. 2 and 3, of only the partial section of the apparatus that is adjacent to the piston accumulator valve.
Figure 5:
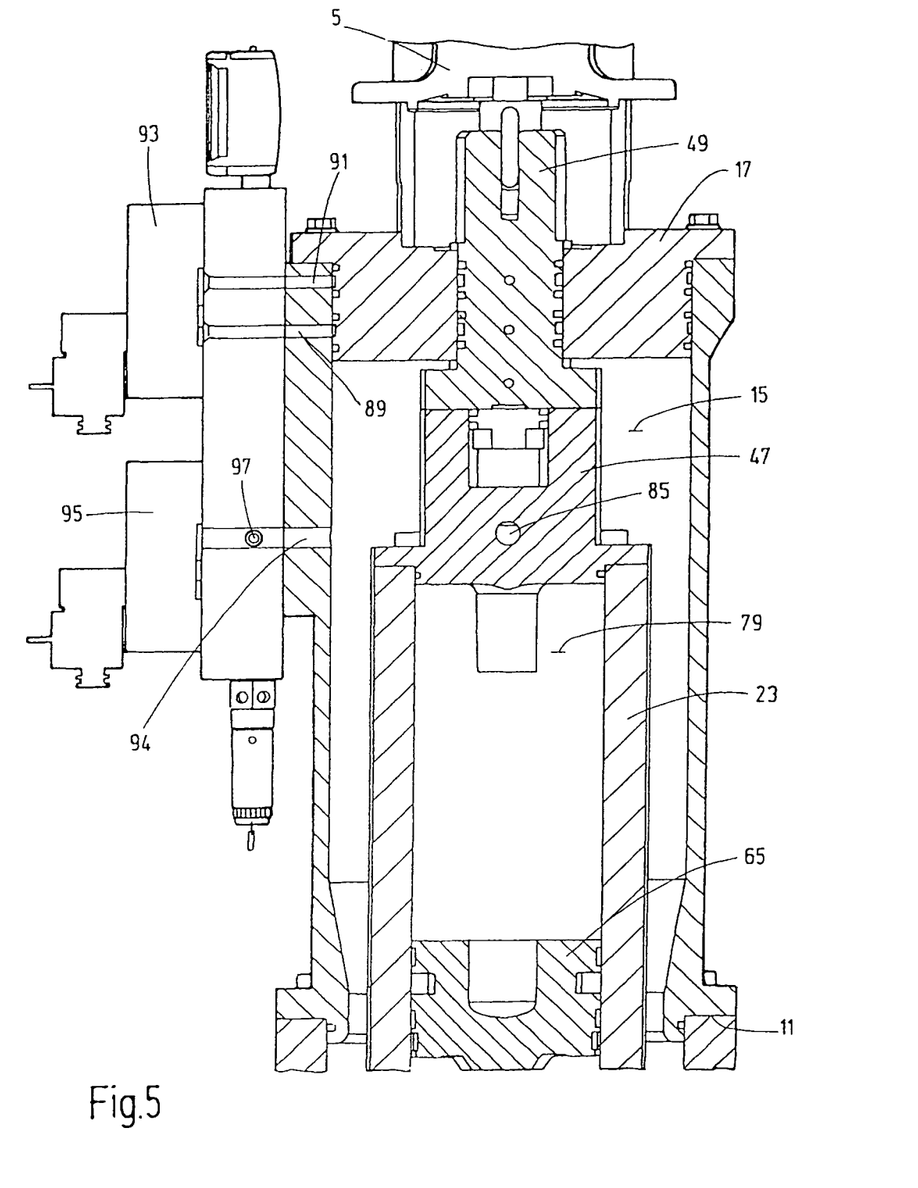
FIG. 5 is a partial side view in section similar to the one shown in FIG. 4, but in a rotated position of the sectional plane in relation to FIG. 4.

In FIG. 4, which shows further details of the piston accumulator valve, the valve piston 81 of the piston accumulator valve is in the upwardly moved open position, where the control rim 83 opens an air inlet 85 from the gas pressure chamber 15 to the fluid chamber 79 in order to drive the accumulator piston 65 downward. To this end, the valve piston 81 can be lifted by the generation of pressure in the valve chamber 87 in that a control pressure medium is supplied via a control line 89. For switching the piston accumulator valve into the closed position, a second control line 91 opens into the valve chamber 87 at the top side of the valve piston 81. To actuate the piston accumulator valve, the control lines 89 and 91 are connected to a 5/2-way valve 93 (FIG. 5), which is, in turn, connected to a control pressure source, presently not shown. Compressed air can be supplied to the gas pressure chamber 15 via a compressed air hook-up or connector 94 by a 3/2-way valve 95. A ventilation hook-up or connector 97 in the directional valve 95 allows, when the piston accumulator valve is in the open position, a reduction of the gas pressure in the fluid chamber 79, such that the bottom fluid chamber 67 of the piston accumulator 13 can be filled, via a flow control regulator 69, with cleaned fluid during the filtration operation. The accumulator piston 65 then moves upward.

FIG. 3 depicts the back-flushing of the element chamber 7 in the operating state, as shown in a sectional representation. As depicted, the back-flushing guide 21 is in the rotational position where the hook-up or connector ends 73 and 77 of the inflow line 71 and/or outflow line 75 are congruent with the chamber hook-up or connector 63 and/or 53 of the element chamber 7. The piston accumulator valve is in the open position, such that, as indicated by the flow arrows in FIG. 3, compressed gas flows into the fluid chamber 79 of the piston accumulator moving the accumulator piston 65 downward. The cleaned fluid in the fluid chamber 67 reaches the clean side 59 of the element chamber 7, as a back-flushing volume, via the inflow line 71. A back-flushing flow of high intensity is generated by the compressed-air pressure and in effect, flowing through the filtering element 9 to be cleaned, from the inside to the outside, loosening dirt particles on the outside of the filter medium 57. The impurities are then discharged via the outflow line 75 and the back-flushing outlet 27. The motor valve 31 releases the back-flushing line 29 for the back-flushing process. After the back-flushing process is complete, when the accumulator piston 65 reaches its bottom end position, the back-flushing line 29 is locked again, and the valve 95 terminates the compressed-air supply, while the valve piston 81 of the piston accumulator valve remains in the open position and the ventilation hook-up or connector 97 on the directional valve 95 is open. The compressed-air pressure in the gas pressure chamber 15 and in the fluid chamber 79 is then reduced again. In the context of the filtration operation that follows, the fluid chamber 67 is recharged, via the regulator means 69, with cleaned fluid, while the accumulator piston 65 moves upward. When this is the case, the piston accumulator valve is closed again by moving the valve piston 81 downward and resupplying the gas pressure chamber 15 via the directional valve 95 with compressed air while the ventilation hook-up or connector 97 is closed, such that the apparatus is ready for a subsequent back-flushing process.

While various embodiments have been chosen to illustrate the invention, it will be understood by those skilled in the art that various changes and modifications can be made therein without departing from the scope of the invention as defined in the claims.

The invention claimed is:

1. A filtering apparatus, comprising:
a filter housing having a filter inlet for receiving unfiltered fluid to be filtered, a filter outlet for discharging filtered fluid and a back-flushing outlet;
a plurality of filter elements arranged in said filter housing such that at least one of said filter elements can be back-flushed during a filtering operation of at least one other of said filter elements;
a back-flushing device back-flushing said at least one of said filter elements, said back-flushing device containing a pressure-control device supporting the back-flushing to clean an effective filtering surface of said at least one of said filter elements, said pressure-control device containing a hydraulic accumulator, said hydraulic accumulator having a first fluid chamber fillable during the filtering operation with a volume of the filtered fluid and connectable to a clean side of said at least one filter element for the back-flushing via a back-flushing guide and having a second fluid chamber pressurizable with a media pressure, said hydraulic accumulator having a movable separating element therein separating said first and second fluid chambers and being moveable by under pressure of the media pressure to force the filtered fluid in said first fluid chamber out of said first fluid chamber for the back-flushing and being movable to allow filtered fluid to fill said first fluid chamber;
an inflow line in said back-flushing guide directly connecting said first fluid chamber to said clean side of said at least one filter element in fluid communication for the back-flushing; and
an outflow line in said back-flushing guide directly connecting said effective filtering surface to said back-flushing outlet of said filter housing in fluid communication for the back-flushing, said back-flushing guide with said inflow line and said outflow line thereof being positioned at only one longitudinal end of said accumulator.

2. A filtering apparatus according to claim 1 wherein said second fluid chamber of said hydraulic accumulator is connected to a control valve connected to a media pressure source.

3. A filtering apparatus according to claim 2 wherein said media pressure source is a compressed-gas source.

4. A filtering apparatus according to claim 1 wherein said hydraulic accumulator and said back-flushing guide are connected to each other, are rotatably disposed in said filter housing and are rotatably adjustable to move between a filtration operation position and a back-flushing operation position by a rotary drive.

5. A filtering apparatus according to claim 1 wherein said hydraulic accumulator comprises a piston accumulator and is rotatable about a cylinder axis together with said back-flushing guide.

6. A filtering apparatus according to claim 1 wherein each of said filter elements are accommodated in a separate element chamber disposed in said filter housing along a circular line concentric about a cylinder axis of said filter housing.

7. A filtering apparatus according to claim 6 wherein each said element chamber comprises a first chamber connector connected to said clean side of said filter element therein and comprises a second chamber connector connected to a dirty side of said filter element therein, said first and second chamber connectors being open toward a main chamber of said filter housing and said back-flushing guide, said back-flushing guide being rotatable and forming a switching valve whose adjustment movements control inflow and outflow of fluid to and from said first and second chamber connectors for the back-flushing.

8. A filtering apparatus according to claim 7 wherein said back-flushing guide comprises an annular body being located along said cylinder axis with said hydraulic accumulator and being spaced from said hydraulic accumulator, said annular body forming a radial projection with a circumferential radial seal engaging a wall of a main chamber of said filter housing, said annular body and said radial seal dividing said main chamber into a filtrate part with said filter outlet and into a non-filtrate part with said filter inlet.

9. A filter apparatus according to claim 8 wherein openings of said first and second chamber connectors are disposed on a wall of said filtrate part and said non-filtrate part, respectively, of said main chamber, said main chamber having a cylindrical surface; and
first and second connector ends project from said cylinder axis and from said inflow line and said outflow line, respectively, and become congruent with said first and second chamber connectors, respectively, with said inflow line connecting said first fluid chamber connector and said outflow line connecting said the second chamber connector to a back-flushing outlet of said main chamber.

10. A filtering apparatus according to claim 9 wherein a valve is connected to and blocks and releases said back-flushing outlet.

11. A filtering apparatus according to claim 8 wherein said first fluid chamber of said hydraulic accumulator is in fluid communication with a flow control regulator disposed in said back-flushing guide between said filtrate part of said main chamber and said inflow line of said back-flushing guide for controlling flow of the filtered fluid into said first fluid chamber.

12. A filtering apparatus according to claim 1 wherein a pressure actuated valve is connected to said second fluid chamber of said hydraulic accumulator and controls connection of said second fluid chamber to a media pressure source.

13. A filtering apparatus according to claim 12 wherein said pressure actuated valve comprises a 5/2-way valve.

14. A filtering apparatus according to claim 12 wherein another valve connects said second fluid chamber of said hydraulic accumulator to said pressure media source in a manner permitting reduction of the media pressure inside said hydraulic accumulator.

15. A filtering apparatus according to claim 14 wherein said another valve is a 3/2-way valve.

16. A filtering apparatus, comprising:
a filter housing having a filter inlet for receiving unfiltered fluid to be filtered, a filter outlet for discharging filtered fluid and a main chamber with a filtrate part and a non-filtrate part;
a plurality of filter elements arranged in said filter housing such that at least one of said filter elements can be back-flushed during a filtering operation of at least one other of said filter elements;
a back-flushing device back-flushing said at least one of said filter elements, said back-flushing device containing a pressure-control device supporting the back-flushing to clean an effective filtering surface of said at least one of said filter elements, said pressure-control device containing a hydraulic accumulator, said hydraulic accumulator having a first fluid chamber fillable during the filtering operation with a volume of the filtered fluid and connectable to a clean side of said at least one filter element for the back-flushing via a back-flushing guide and having a second fluid chamber pressurizable with a media pressure, said hydraulic accumulator having a movable separating element therein separating said first and second fluid chambers and being moveable under pressure of the media pressure to force the filtered fluid in said first fluid chamber out of said first fluid chamber for the back-flushing and being movable to allow filtered fluid to fill said first fluid chamber;
an inflow line in said back-flushing guide directly connecting said first fluid chamber to said clean side of said at least one filter element in fluid communication for the back-flushing; and
a flow control regulator fluidly communicating with said first fluid chamber of said hydraulic accumulator and disposed in said back-flushing guide between said filtrate part of said main chamber and said inflow line of said back-flushing guide for filling said first fluid chamber with filtered fluid.

* * * * *